Aug. 13, 1940.  W. T. CALDWELL  2,211,455
PISTON
Filed Dec. 1, 1937  2 Sheets-Sheet 1
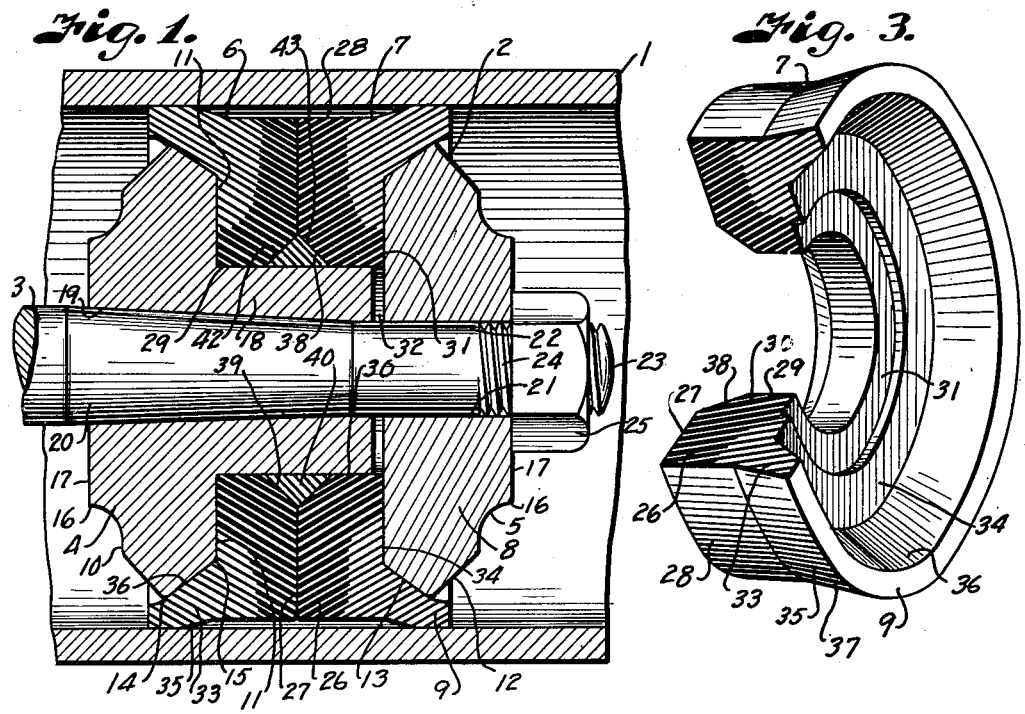
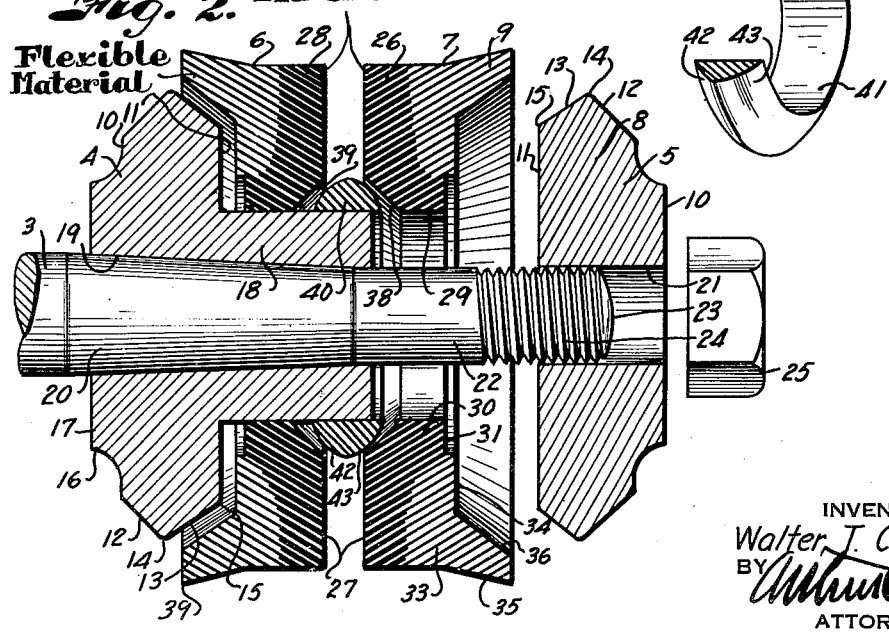
INVENTOR
Walter T. Caldwell.
BY
ATTORNEY Aug. 13, 1940.  W. T. CALDWELL  2,211,455
PISTON
Filed Dec. 1, 1937  2 Sheets-Sheet 2
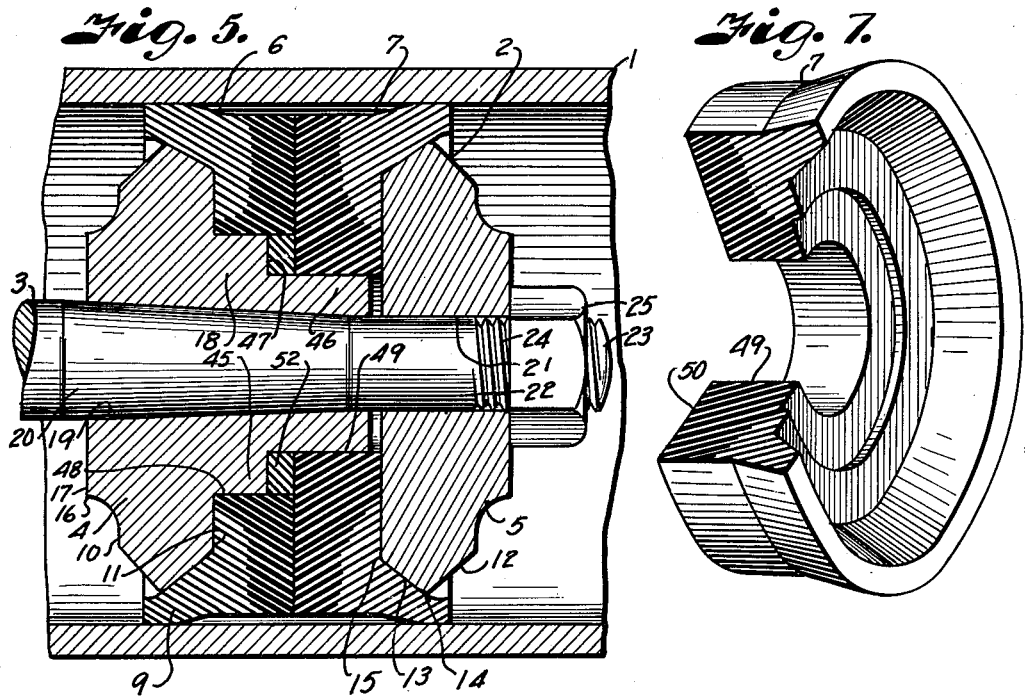
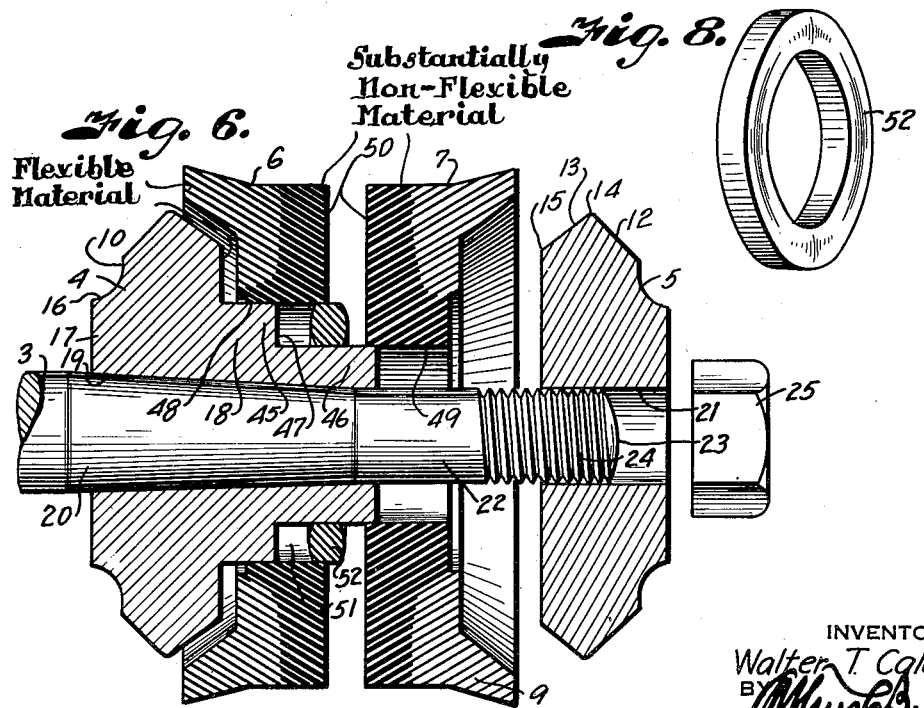
INVENTOR
Walter T. Caldwell.
BY
ATTORNEY Patented Aug. 13, 1940

2,211,455

UNITED STATES PATENT OFFICE 2,211,455

PISTON

Walter T. Caldwell, Enid, Okla., assignor to The George E. Failing Supply Company, Enid, Okla., a corporation of Oklahoma Application December 1, 1937, Serial No. 177,637

5 Claims. (Cl. 309—23)

This invention relates to pistons and particularly to those for use in pumps, hydraulic jacks and like apparatus provided with composite pistons equipped with ring-like packing cups having portions that are sufficiently flexible to be urged into sealing contact with a cylinder wall responsive to fluid pressure acting upon the cups.

In composite pistons of this character, it is difficult to maintain an adequate seal between the inner diameter of the cups and the supporting piston structure, particularly when the piston is operating under high fluid pressures.

It is, therefore, a principal object of the present invention to provide a composite piston, constructed to prevent leakage through the interior thereof and under the packing cups.

It is also an important object of the invention to provide a composite piston wherein the parts are rigidly held in place and which are readily removed for inspection, repairs and replacement.

In accomplishing these and other objects of the invention, as hereinafter pointed out, I have provided improved details of structure, the preferred form of which is illustrated in the accompanying drawings, wherein:

Fig. 1 is a longitudinal sectional view through a piston constructed and equipped with packing rings and a sealing member in accordance with the present invention and showing the piston in working position within a cylinder.

Fig. 2 is a similar section through the parts of the piston which are shown in slightly spaced relation to better illustrate their construction and the normal shape of the sealing members before they are clamped in the piston assembly.

Fig. 3 is a perspective view of one of the packing rings of the piston, a part of which is broken away to better illustrate the construction thereof.

Fig. 4 is a perspective view of the inner sealing member, also shown partly in section.

Fig. 5 is a longitudinal section through a cylinder and piston showing a modification of the form of invention illustrated in Fig. 1.

Fig. 6 is a longitudinal section through the piston illustrated in Fig. 5, showing the parts thereof in spaced relation.

Fig. 7 is a perspective view of one of the packing rings used in the modified form of the invention.

Fig. 8 is a perspective view of the internal sealing member used in the modified form of piston structure.

Referring more in detail to the drawings and first to Figs. 1 to 4 inclusive:

1 designates a portion of the cylinder of a pump, hydraulic jack or similar apparatus wherein a fluid is acted upon by a piston 2 under high working pressures as in the case of a pump, or wherein a high pressure fluid operates the piston as in the instance of a hydraulic jack. In either instance, the piston is slidable relative to the cylinder under control of a piston rod 3, and it is necessary to maintain a tight seal about the periphery of the piston to prevent leakage of fluid around and through the piston.

The piston 2 is constructed in accordance with the present invention and is designed to maintain a seal between high pressure fluids in the respective ends of the cylinder as in the case of a double acting pump or a hydraulic jack where the pressure fluid acts on both ends of the piston. The piston is of composite construction and includes a pair of clamping members or heads 4 and 5 for retaining oppositely facing packing rings 6 and 7.

The clamping members 4 and 5 each include a substantially disk-like body 8 of thickness to withstand the necessary working pressures and of smaller diameter than the inner diameter of the cylinder to accommodate flexible lips or flanges 9 of the packing rings, as later described. The peripheral corners of the disks are beveled from the end faces 10 and 11 toward the center thereof, as shown at 12 and 13, to terminate in a slightly rounded periphery 14. The beveled faces 13 of the respective disks constitute annular seating faces for the lip portions 9 of the packing rings and the junctures thereof with the end faces 11 are slightly rounded, as at 15. The opposite end faces 10 of the disks carry outwardly projecting cylindrical bosses 16 having flat ends 17.

The disk-like body of the clamping member 4 has a packing centering collar 18 projecting from the end face 11 thereof and of sufficient length to mount the packing rings 6 and 7 thereon so that the packing elements are concentric with the axis of the piston and are clamped between the end or clamping faces 13 of the respective members 4 and 5. The member 4 is further provided with a tapered, axial bore 19, with its larger end opening through the boss 16 thereof to accommodate a correspondingly tapered portion 20 of the piston rod 3. The clamping member 5, however, has a central, cylindrical bore 21 registering with the smaller end of the tapered bore of the other member to accommodate a cylindrical extension 22 of the piston rod. The terminal end 23 of the rod projects from the boss 16 of the clamping member 5, and is provided with threads 24 for mounting a jam-nut 25. The clamping member 4, when mounted on the tapered portion of the piston rod, is securely wedged from longitudinal movement and forms an abutment against which the packing elements are clamped by the other clamping member 5, the member 5 being slidably movable on the extension 22 responsive to tightening of the nut 25.

The packing elements 6 and 7 are of composite construction and each includes a body or backing portion 26 formed of material having little or no flexibility and such as hard rubber or other material in the form of a ring having a flat face 27, a cylindrical peripheral face 28 spaced from the inner surface of the cylinder, and a central opening 29 of suitable diameter so that the ring is snugly slidable on the centering collar 18 of the clamping member 4. The body 26 is also shaped to provide a central collar 30 having a flat end face 31 adapted to abut against a respective piston head member. The combined width of the non-flexible portions of the collars 30 for the packing rings is slightly greater than the length of the centering collar 18 to provide a space 32 between the end of the centering collar and the clamping face 11 of the member 5 when the non-flexible portions of the packing rings are drawn into abutting contact and the clamping members of the piston are drawn into clamping relation with the flexible facings now to be described.

Autogenously connected or cemented to the backing portion of each ring is a resilient and flexible material such as soft rubber 33. The soft rubber 33 is shaped to project beyond the end face 31 to form flat, flexible clamp engaging faces 34, and extending from the periphery thereof in overlying relation with the seating bevels 13, is the annular lip or flange portion 9, above mentioned. The annular lip portions 9 have outwardly flaring annular faces 35 that sealingly contact with the working surface of the cylinder and inner tapering faces 36 which correspond to the bevels 13 of the clamping members so that the lips are supported thereby from excessive distortion when the piston is in service. The terminal portions 37 of the lips, when in relaxed condition, as shown in Fig. 2, are of normally larger circumference than the inner circumference of the cylinder so that when the packing rings are secured in the piston assembly and the piston assembly is inserted in the cylinder, the lips are pressed over the rounded peripheries 14 of the disk portions of the clamping members, as shown in Fig. 1.

In order to cooperate with the compressible faces 34 to guard against leakage through the piston and around the centering collar 18, the non-flexible backing portions of the rings are beveled about the periphery of the openings 29, as at 38, to form an annular recess 39 about the collar. Inserted in the recess is a sealing ring 40 that is formed of resilient material. The ring 40 is of substantially triangular shaped cross-section and has a cylindrical inner face 41 to seal against the centering collar and slightly rounded converging faces 42 and 43 that sealingly engage the bevels 38. The ring 40 is of sufficient size so that it is tightly pressed between the bevels and against the collar 18 when the parts are assembled, as now to be described.

In assembling the piston parts, the clamping member 4 is pressed upon the tapered portion 20 of the piston rod so that it is rigidly retained from longitudinal movement thereon. The packing rings 6 and 7 are then sleeved over the centering collar 18 with the faces 27 in contacting relation, and with the sealing ring 40 located within the annular recess 39. The clamping member 5 is then sleeved over the extension 22 and the jam-nut 25 is applied on the threaded terminal of the piston rod. The jam-nut 25 is then tightened to draw the end faces 31 of the packing rings into stopping abutment with the clamping members, as shown in Fig. 1. When thus tightened, the spacing between the clamping members is fixed and the flat faces 34 of the soft rubber are tightly pressed against the clamping faces 11 of the clamping members. The sealing ring 40 is also compressed incidental to the clamping action to prevent leakage through the body of the piston and around the centering collar.

The flaring faces 35 of the flexible lip portions 9 of the packing rings are firmly seated on the beveled faces 13 to support the terminal of the lips or flange 9 in cylinder sealing position. The piston assembly is then inserted in the cylinder so that the flexible lips thereof are supported by the rounded peripheries 14 of the clamping members, as shown in Fig. 1. After the piston is assembled as described and placed in service, the clamping members cannot work loose upon the piston rod since they are supported in one direction between the taper 20 and the nut 25 and in the other direction by the fixed spacing maintained by the non-flexible portions of the packing rings. The degree of pressibility acting on the flexible and resilient portions of the rings is therefore held constant, and there is no undue distortion or outward swelling thereof during reciprocatory movement of the piston.

In the modified form of the invention, shown in Figs. 5 to 8 inclusive, the packing centering collar 18 which projects from the end face 11 of the member 4, has stepped portions 45 and 46 to respectively mount the packing rings 6 and 7 thereon and to form an annular shoulder 47 therebetween. The central openings 48 and 49 in the respective packing rings conform to the stepped portions of the centering collar, and the flat face 50 of the ring 7 cooperates with the shoulder 47 and with the inner circumference of the opening 48 of the ring 6 to form an annular recess 51 of substantially rectangular cross-section for accommodating a sealing member 52, similar to the sealing ring 40 of the preferred form of the invention, however, the cross-sectional shape of the ring conforms to the shape of the recess.

Pistons constructed and equipped with packing rings and sealing members as described are serviceable for long periods under high working pressures without leakage through the interior of the pistons.

The packing rings formed as units may be conveniently removed from the piston and new units applied as occasion demands, and it is further apparent that repairs to the piston and replacement of parts may be carried out with ordinary tools that are readily available.

What I claim and desire to secure by Letters Patent is:

1. A composite piston including a clamping member having a stepped centering collar forming an annular shoulder between said stepped portions, packing members mounted on the respective stepped portions of the centering collar, a sealing ring engaging said shoulder and sealingly engaging the packing members, a cooperative clamping member, and means for drawing said clamping members together for anchoring the packing members on the centering collar and for pressing said sealing ring.

2. A composite piston including a clamping member having a stepped centering collar forming an annular shoulder between said stepped portions, packing members having substantially rigid backing portions mounted on the respective stepped portions of the centering collar, flexible facings on said backing portions, a sealing ring engaging said shoulder and centeringly engaging the packing members, a cooperative clamping member, and means for drawing said clamping members into pressing relation with said flexible facings and for pressing said sealing ring.

3. A composite piston including a clamping member having a stepped centering collar forming an annular shoulder between said stepped portions, packing members having substantially rigid backing portions on the respective stepped portions of the centering collar and having abutting contact in offset relation with said annular shoulder to form an annular recess therebetween, flexible facings on said backing portions, a sealing ring engaged in said recess, a cooperative clamping member, and means for drawing said clamping members into sealing relation with said flexible facings and to sealingly press said sealing ring to prevent leakage through the piston structure.

4. A composite piston including a pair of clamping members, centering means between said members and having differential diameters to form stepped portions, packing members mounted on the respective stepped portions, a sealing ring sleeved on the smaller of said stepped portions and engaging the other stepped portion in sealing relation with said packing members, and means for drawing said clamping members together for anchoring the packing members and effecting seal of said sealing ring.

5. A composite piston including a pair of clamping members with at least one of said members having a packing supporting collar, a pair of packing rings sleeved relatively to said collar and formed of normally resilient material attached to a similar non-flexible material to provide abutting, substantially non-flexible body portions with end portions abutting directly against said clamping members for maintaining a definitely fixed spacing between said clamping members and to provide flexible facings normally projecting beyond said end portions and terminating in annular lip portions projecting over the clamping members, a sealing ring encircling the supporting collar and having sealing engagement with the respective non-flexible portions of the packing rings at the base of said abutting portions, and means for drawing said clamping members together to maintain said fixed spacing upon engagement of the clamping members with said end portions and to sealingly press said flexible facings into substantial registry with the end portions and for pressing the sealing ring into sealing contact with the collar.

WALTER T. CALDWELL.